June 15, 1948. D. V. SEEVERS 2,443,276
METHOD AND APPARATUS FOR LOADING AIRCRAFT
Filed May 22, 1942 2 Sheets-Sheet 1

INVENTOR
DON V. SEEVERS
BY Albert M. Austin
ATTORNEY

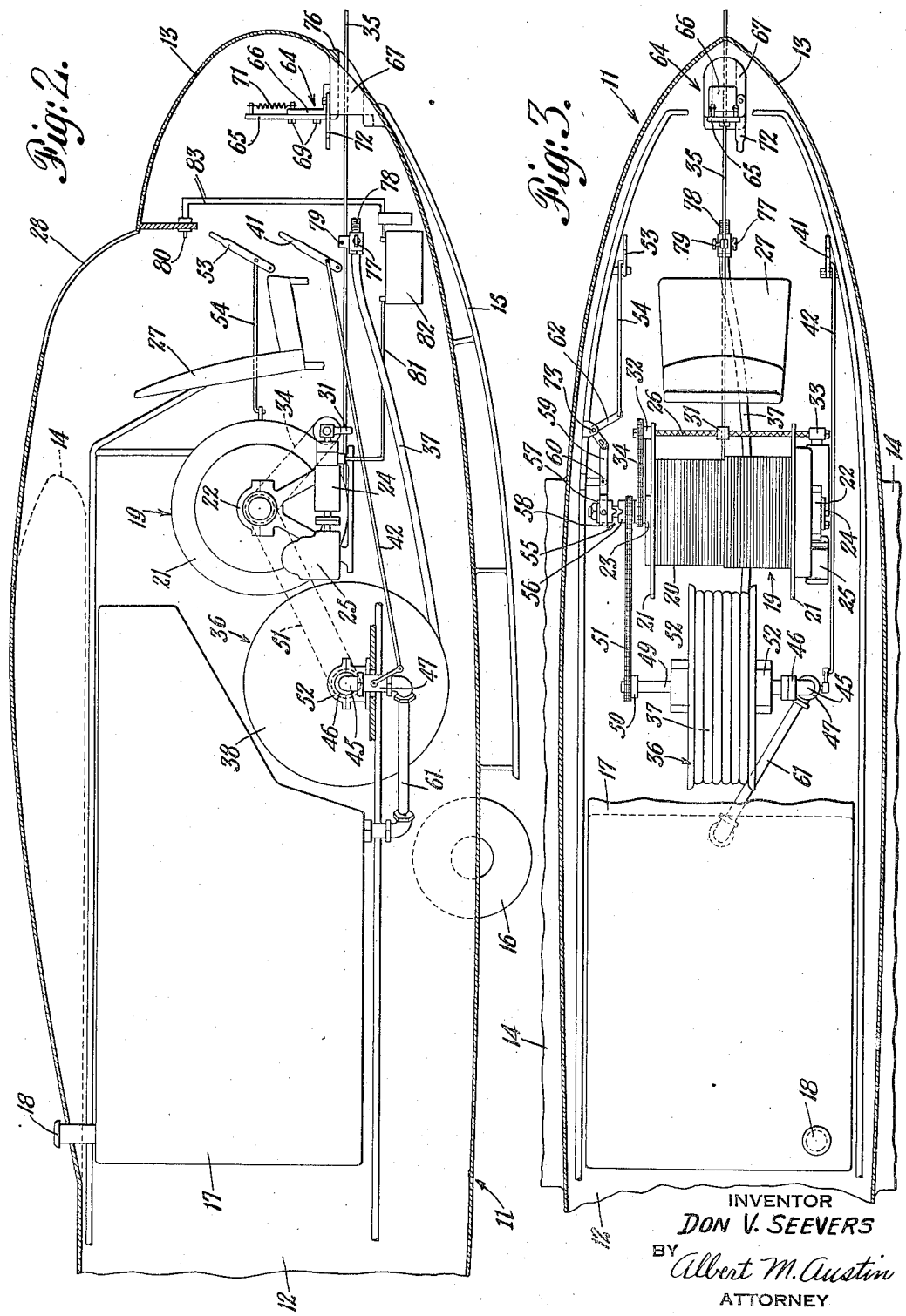

Patented June 15, 1948

2,443,276

UNITED STATES PATENT OFFICE 2,443,276

METHOD AND APPARATUS FOR LOADING
AIRCRAFT

Don V. Seevers, Wilmington, Del., assignor to All
American Aviation, Inc., Wilmington, Del., a
corporation of Delaware Application May 22, 1942, Serial No. 444,129

3 Claims. (Cl. 244—3)

The invention relates to aviation and more particularly to supplying fuel or other fluid to an aircraft while in flight.

It is well known that one of the factors limiting the maximum load carrying capacity of an airplane is its ability to take off and that a plane can carry a heavier load when in flight than it can take off with from the regular airports. According to the present invention, it is proposed that the plane be filled with only a limited amount of fuel prior to take-off, so that it can take off with a heavier pay-load and then, after the plane has acquired flying speed and is in full flight, it is proposed to supply it with the necessary fuel. Further, an airplane can greatly extend the load which it can transport if a part of that load is in a glider towed by the aircraft. Thus, if the glider is loaded with fuel, and means provided for transferring the fuel to the plane, the ordinary cruising range of the airplane can be extended.

According to the invention, it is proposed to launch "tanker" gliders carrying reservoirs of gasoline for supplying an airplane in flight. Any desired method may be used for launching the gliders. For example, the plane which is to be fueled may be used to pick up and launch the grounded glider after the plane has acquired flying speed. Or, the glider may be launched by separate launching means.

According to a preferred form of the invention, the glider, in addition to having a large gasoline tank, may be provided with a winch and a hose reel. The winch has a line wound thereon by which contact is made between the plane to be fueled and the glider. The hose reel may have flexible hose wound thereon and a suitable clamping device may connect the end of the hose and the line, by which the hose may be drawn from the glider to the fuel tank of the plane. Suitable devices may be provided for paying out and reeling in the line independently of the hose or for paying out and reeling in the hose and line together. If desired, the winch may have automatic braking devices thereon for automatically exerting a predetermined pull on the line while paying it out for the purpose of utilizing this line for picking up a stationary glider by the plane in flight.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 represents diagrammatically the relative positions of the glider and plane while the glider is feeding fuel to the plane.

Fig. 2 is a longitudinal vertical section through the glider illustrating the position of the fuel tank, the automatic winch, the hose reel and the controls.

Fig. 3 is a longitudinal plan section taken through the glider.

Figure 6:
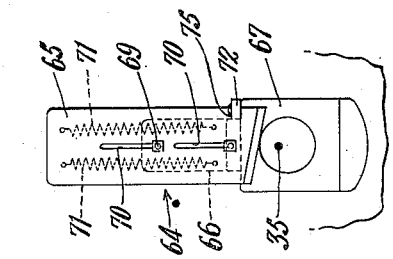
Fig. 6 is a detail of the guillotine device for cutting the line and hose in an emergency.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Figure 1:
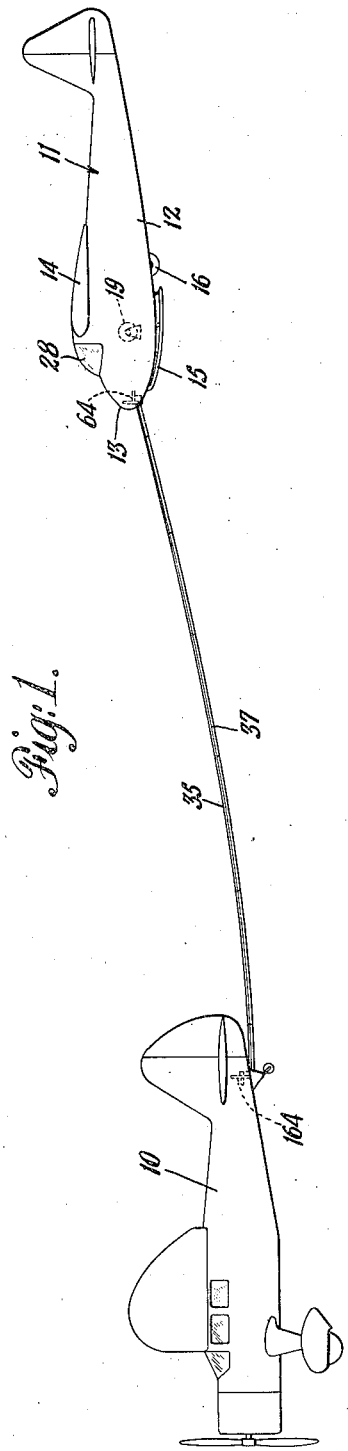

Referring now to the drawings, and more particularly to Figs. 1, 2 and 3, the plane to be fueled is indicated by 10 and the tanker glider is indicated by 11. The glider and its fueling apparatus will first be described. The glider 11 comprises a fuselage 12 having a nose 13, wings 14, skids 15 and ground wheel 16. It will be understood that the glider may be of any common construction but of sufficient size to carry a large tank of fuel such as gasoline or Diesel oil. The gas tank is indicated by 17 and has a filler cap 18. The pilot's seat is indicated by 27, the glider being provided with a transparent windshield 28 at the pilot's seat as will be understood by those skilled in the art.

Aft of the pilot's seat 27 is a winch 19 comprising a drum 20 having side flanges 21 on which the line 35 is wound. The drum 20 is journaled in supports 22 and 23 secured to the framework of the glider. The winch 19 is controlled by an electric motor 24 driving the winch through reduction gearing 25.

For evenly winding the line 35 on the winch 19, a cable threader is provided. This threader comprises a drum or screw 26 suitably journaled in frame bearings 32 and 33 and carrying a traveler 31 through which the line 35 passes. The screw 26 is driven by a sprocket mounted thereon and by a sprocket mounted on the main shaft of the winch 19 which sprockets are connected by a chain 34.

It will be understood that the cable threader may be of any ordinary construction and it is thought that the above description is sufficient for those skilled in the art. It will be understood furthermore that the winch may be of any ordinary construction permitting power driven rotation in either direction so that the line 35 may be paid out or taken in. If desired, the winch 19 may be of the automatic type disclosed in U. S. Patent 2,373,414, in the name of Stuart C. Plummer, which construction has provision for exerting a predetermined braking effort on the line 35 while permitting it to pay out. The Plummer winch is particularly desirable when the plane 10 is used for the purpose of launching the glider 11. This winch acts to reduce shock when contact is made between the plane 10 in flight and the stationary glider 11. In the aforementioned Plummer case the automatic winch is mounted upon the airplane, while in the present application the automatic winch would be mounted on the glider.

The automatic winch and the method disclosed in U. S. Patent 2,402,918, in the name of Arthur B. Schultz, may also be used instead of winch 19 when the plane 10 is used to launch the glider. This patent is hereby incorporated insofar as may be necessary to complete the disclosure.

Figure 4:
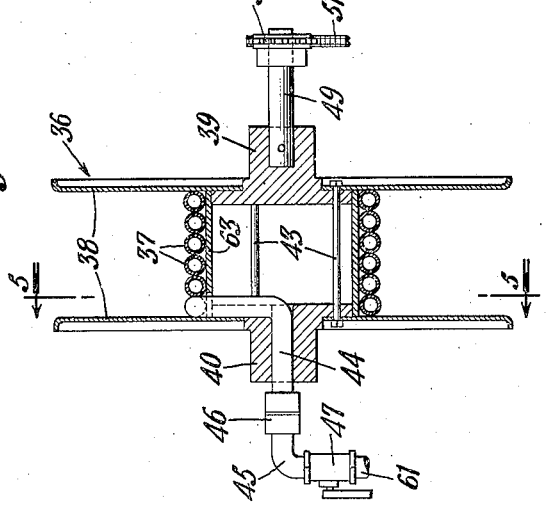
Fig. 4 is a transverse section through the hose reel.
Figure 5:
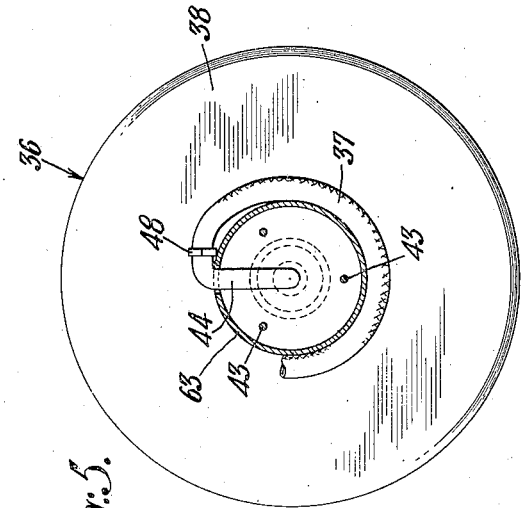
Fig. 5 is a section through the hose reel taken on the line 5—5, Fig. 4.

The hose reel 36 has wound thereon a flexible hose 37 made of rubber or any other suitable material. This reel, Fig. 4, comprises flanges 38 mounted on hubs 39 and 40 mounted within a sleeve 63 and the entire assembly is held together by a series of rods 43. A pipe 44 is fixedly mounted in hub 40 and has connection 48 with the flexible hose 37. Pipe 44 communicates with stationary pipe 45 through a slip joint 46, which permits fluid to flow between pipes 44 and 45 while permitting the reel 36 to rotate. Pipe 45 is connected to valve 47, which in turn is connected to pipe 61 extending to the bottom of gas tank 17. Valve 47 is connected to handle 41 by rod 42.

Hub 39 has pinned thereto a suitable shaft 49 on which is mounted sprocket 50 carrying a chain 51, which extends to a sprocket 56 loosely mounted on the main shaft of winch 19. Sprocket 56 forms part of a dog tooth clutch 55 with clutch section 57 feather-keyed on the main drive shaft of winch 19. Clutch section 57 has an annular groove in which rides a collar 58 having a pivoted connection with forked shift rod 59. Rod 59 is pivoted to fulcrum 60 and is connected to bell crank 62 pivoted at 73 and in turn is connected to link 54 which is connected to hand lever 53. Thus the pilot may throw clutch 55 in or out by lever 53.

The line 35 and the hose 37 pass out through the skin of the glider through a channel 67 having an air baffle or deflector 76, which deflects the air stream clear of the channel 67 to prevent air from entering the glider through this opening.

Mounted upon the channel 67 is a guillotine knife 64 for the purpose of cutting line 35 and hose 37 in an emergency. The channel 67 has a support 66 carrying studs 69 (see also Fig. 6). Slidably mounted on support 66 is a blade 65 having slots 70 embracing the studs 69. A pivoted lever 72 engages under shoulder 75 on blade 65 and positively prevents the springs 71, which operate between the blade 65 and supports 66, from operating the guillotine knife 64.

It will be understood that this guillotine construction is for emergency purposes only and is for the purpose of cutting off the line 35 alone or both the line 35 and hose 37 together to entirely free the glider from the plane. This is accomplished merely by the pilot kicking the lever 72 to the right, Fig. 3. A similar guillotine device 164 may be provided on the airplane where the connecting line 35 and hose 37 passes into it.

The ordinary glider controls for maneuvering the glider are omitted for sake of clearness. In addition to these standard controls the following additional controls are provided: Handle 41 opens and closes gas valve 47. Handle 53 engages and disengages clutch 55 to drive or release hose reel 36. Valve 77 is provided to open and close the hose fitting 78 on the end of hose 37. A clamp 79 is provided for releasably clamping the fitting 78 to line 35. When clamp 79 is opened, line 35 may slide freely through it without pulling hose 37. When clamp 79 is tightened, the pulling out of line 35 from the glider pulls hose 37 along with it. For controlling motor 24, suitable electric devices are provided. Battery 82 is connected by wiring 81 and 83 to electric control 80 by means of which the winch 19 may be rotated to draw in line 35 or to pay it out and, if desired, at variable speeds.

One technique for utilizing the glider and its apparatus will now be described. Assuming that the glider is resting on the ground, it will be filled with gas and the valves 47 and 77 will be closed. The clutch 55 will be open, the clamp 79 will be open, and the electric switch 80 will be in neutral position with the winch 19 stationary.

The glider may be launched in any desired way by any well-known method.

If desired, the glider may be launched in any of the ways disclosed in U. S. Patent 2,402,918, in the name of Arthur B. Schultz.

The plane 10 to be fueled may act as the launching plane or a separate launching plane may be provided. In either event the glider with its tank full of fuel will be maneuvered to a sufficient height to permit carrying out the fueling operation with convenience and safety.

The plane 10 to be fueled will now be loaded with the full desired pay-load and will take off with a limited amount of gasoline, the remaining gas to be added after it is in flight.

The plane 10 and glider 11 will be maneuvered in the air so that the plane occupies a position conveniently under the glider. The glider pilot will then operate winch 19 to pay out line 35 without hose 37. The line 35 will be engaged by an operator in the plane 10, and wound upon a suitable winch (not shown) in the plane. This winch will take in the line 35 while winch 19 pays it out. If desired, sufficient tension may be maintained on the line so that the plane 10 actually tows the glider. Or, the glider may operate as a true glider during the fueling process. The relative positions of glider and plane may now be somewhat as indicated in Fig. 1.

The glider pilot may now tighten clamp 79 and operate lever 53 to engage clutch 55 to pay out hose 37 along with line 35. The fitting 78 is thus carried into the plane 10 whence it is connected with the filler cap (not shown) of the gas tank of the plane. At the proper signal, the valve 77 will be opened by the fueling operator in the plane 10 and the valve 47 will be opened by the glider pilot, permitting gasoline to flow by gravity from the reservoir tank 17 into the tank of the plane 10.

After the plane 10 is fueled, upon proper signal the valves 77 and 47 will be closed and the fitting 78 will be disconnected from the gas tank of the plane 10. Upon proper signal the plane winch will unwind line 35 and the glider pilot will operate switch 80 to reel in line 35 and operate lever 53 to reel in hose 37. Line 35 and hose 37 may be reeled up so as to be drawn entirely within the glider, after which the glider may be maneuvered to land in any well-known way on the landing field. The plane 10 now contains a full supply of fuel and a full pay-load.

Thus, a method and apparatus is disclosed which materially improves the operation of aircraft. The invention is particularly advantageous with heavy transport planes used for carrying either persons or freight. The plane may be loaded with its full desired pay-load while on the ground and with only sufficient gasoline to temporarily fly it. Thus, the danger from fire resulting from any accidental crash of the airplane during take-off is materially reduced because of the greatly reduced amount of gasoline in the plane tank. Furthermore, a greatly increased pay-load may be carried because of the lightening effect of the greatly decreased gasoline which in turn decreases the critical take-off weight.

The use of a glider for carrying this fuel instead of an auxiliary powered plane greatly reduces the fire hazard because of the absence of an engine. A glider capable of carrying heavy loads can be conveniently launched and will maintain flight for many hours, if necessary, once it acquires sufficient flying height. It is a comparatively simple matter to establish connection between the glider and the plane and to fill the plane tanks with fuel while flying. Two or more gliders may be provided, if one is insufficient, for the purpose of completely filling the fuel tanks on the plane. The presence of large fuel tanks on the glider also has the advantage that, when empty, these tanks constitute effective floats for keeping the glider afloat if it is necessary to come down on water. The use of a connecting line in addition to the hose removes strain from the hose and permits the plane to tow the glider if desired while fuel is being transferred.

It is obvious that if desired other materials, such as water instead of fuel, may be supplied during flight. In case the pay-load in a freight-carrying transport constitutes an easily flowable and non-inflammable substance, the transport plane may be launched with its entire fuel supply and part or all of the pay-load supplied while in flight.

Another use to which such an apparatus and method might be put would be refueling enroute. Thus, the aircraft would take off with its full load and the glider with its full load and the glider would be towed by the airplane for a part of the journey. The fuel could be transferred from the glider to the aircraft as it approached a point where its own fuel was exhausted. The glider could then be cut loose, if over suitable terrain. Otherwise it could continue to be towed and would create less drag on the aircraft due to its reduced weight.

While certain novel features of the invention have been disclosed herein, and are pointed out in the annexed claims, it will be understood that various omissions, substitutions and changes may be made by those skilled in the art without departing from the spirit of the invention.

What is claimed is:

1. Apparatus for supplying fuel to aircraft comprising, a glider, a fuel tank on said glider, a reel and a winch on said glider, a line wound on said winch adapted to be engaged by the craft to which fuel is to be supplied, a hose wound on said reel and having connection with said fuel tank, clamping means for clamping said hose to said line whereby, by paying out said line from said glider and taking it up on said craft, said hose may be joined to said craft, a source of power and braking devices connected to said winch for controlling the rotation of said winch, and a controllable power transfer device between said winch and said reel.

2. In the fueling of an aircraft having an engine and a fuel tank, the method involving the use of a glider having manually operable controls, a fuel tank, and a hose connected to said fuel tank and mounted on a reel, said method comprising the steps of: first, partially filling said fuel tank in said aircraft while the latter is grounded, operating said aircraft to cause it to take off and acquire flying speed, filling said fuel tank in said glider with fuel, picking up said glider by said aircraft, manipulating the controls of said glider to cause it to be air borne, further manipulating the controls of said glider to cause it to assume a flying positions above the aircraft, operating said reel and hose to establish a conductive connection between said fuel tank in said glider and said fuel tank in said aircraft, and transferring fuel from said tank in said glider to said tank in said aircraft under gravity action.

3. In the fueling of an aircraft in flight from a glider having manually operable controls, a loaded fuel tank, and a supply hose connected to said fuel tank and mounted on a reel, the method comprising the steps of: picking up said glider by said aircraft, manipulating said controls to cause said glider to be towed by said aircraft and assume a positive thereabove, connecting said supply hose to said aircraft, simultaneously operating said controls and said reel to cause said glider and aircraft to maintain the relative positions in which the glider is above the aircraft, causing fuel to flow from said tank in said glider through said supply hose to said aircraft, and thereafter casting loose said glider from said aircraft.

DON V. SEEVERS.

REFERENCES CITED

The following references are of record in the file of this patent:

UNITED STATES PATENTS

| Number | Name | Date |
|---|---|---|
| 1,685,927 | Miller | Oct. 2, 1928 |
| 1,728,449 | Procofieff-Seversky | Sept. 17, 1929 |
| 1,806,833 | Ullendorff | May 26, 1931 |
| 2,102,604 | Arndt | Dec. 21, 1937 |
| 2,124,867 | Akerman | July 26, 1938 |
| 2,261,598 | Tyson | Nov. 4, 1941 |
| 2,399,215 | Fahrney | Apr. 30, 1946 |

FOREIGN PATENTS

| Number | Country | Date |
|---|---|---|
| 13,921 | Great Britain | 1914 |
| 369,228 | Great Britain | Mar. 16, 1932 |
| 798,180 | France | Mar. 2, 1936 |

OTHER REFERENCES

Publication: "The Aeroplane" of Nov. 15, 1940, pages 552 to 555; article by Fitzwilliams.